United States Patent
Tu et al.

(10) Patent No.: US 10,641,965 B2
(45) Date of Patent: *May 5, 2020

(54) OPTICAL DISPERSION COMPENSATOR ON SILICON

(71) Applicant: INPHI CORPORATION, Santa Clara, CA (US)

(72) Inventors: Xiaoguang Tu, Santa Clara, CA (US); Radhakrishnan L. Nagarajan, Santa Clara, CA (US); Masaki Kato, Palo Alto, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,172

(22) Filed: Dec. 9, 2019

(65) Prior Publication Data

US 2020/0110220 A1 Apr. 9, 2020

Related U.S. Application Data

(63) Continuation of application No. 16/157,409, filed on Oct. 11, 2018, now Pat. No. 10,527,795, which is a continuation-in-part of application No. 15/668,584, filed on Aug. 3, 2017, now Pat. No. 10,126,629.

(51) Int. Cl.
*G02B 6/293* (2006.01)
*G02B 6/122* (2006.01)
*G02B 6/30* (2006.01)
*G02B 6/02* (2006.01)
(Continued)

(52) U.S. Cl.
CPC ......... *G02B 6/29394* (2013.01); *G02B 6/021* (2013.01); *G02B 6/1225* (2013.01); *G02B 6/30* (2013.01); *H04B 10/25133* (2013.01); *G02B 6/29395* (2013.01); *G02B 2006/1215* (2013.01);
(Continued)

(58) Field of Classification Search
CPC ............ G02B 6/29394; G02B 6/29395; G02F 2001/212; G02F 1/2252
See application file for complete search history.

(56) References Cited

U.S. PATENT DOCUMENTS

| 8,488,922 | B2* | 7/2013 | Little | G02B 6/29343 385/24 |
| 10,126,629 | B1* | 11/2018 | Tu | H04B 10/2507 |
| 10,527,795 | B2* | 1/2020 | Tu | G02B 6/1225 |

(Continued)

*Primary Examiner* — Sung H Pak
(74) *Attorney, Agent, or Firm* — Richard T. Ogawa; Ogawa P.C.

(57) ABSTRACT

An optical dispersion compensator integrated with a silicon photonics system including a first phase-shifter coupled to a second phase-shifter in parallel on the silicon substrate characterized in an athermal condition. The dispersion compensator further includes a third phase-shifter on the silicon substrate to the first phase-shifter and the second phase-shifter through two 2×2 splitters to form an optical loop. A second entry port of a first 2×2 splitter is for coupling with an input fiber and a second exit port of a second 2×2 splitter is for coupling with an output fiber. The optical loop is characterized by a total phase delay tunable via each of the first phase-shifter, the second phase-shifter, and the third phase-shifter such that a normal dispersion (>0) at a certain wavelength in the input fiber is substantially compensated and independent of temperature.

23 Claims, 12 Drawing Sheets

(51) Int. Cl.
*H04B 10/2513* (2013.01)
*G02B 6/12* (2006.01)

(52) U.S. Cl.
CPC .............. *G02B 2006/12061* (2013.01); *G02B 2006/12159* (2013.01)

(56) References Cited

U.S. PATENT DOCUMENTS

| | | | | |
|---|---|---|---|---|
| 2003/0206676 | A1* | 11/2003 | Ovadia | G02B 6/12007 385/11 |
| 2007/0053633 | A1* | 3/2007 | Doerr | G02B 6/12007 385/27 |
| 2009/0092350 | A1* | 4/2009 | Gill | G02F 1/225 385/3 |
| 2009/0116786 | A1* | 5/2009 | Little | G02B 6/29343 385/27 |
| 2009/0180729 | A1* | 7/2009 | Rasras | G02B 6/12007 385/11 |
| 2015/0354938 | A1* | 12/2015 | Mower | G06N 10/00 356/477 |
| 2018/0062754 | A1* | 3/2018 | Dupuis | G02F 1/0123 |
| 2019/0041580 | A1* | 2/2019 | Tu | H04B 10/25133 |

* cited by examiner

OPTICAL DISPERSION COMPENSATOR ON SILICON

CROSS-REFERENCE TO RELATED APPLICATIONS

This application is a continuation of and claims priority to U.S. application Ser. No. 16/157,409, filed Oct. 11, 2018, which is a continuation-in-part of and claiming priority to U.S. application Ser. No. 15/668,584, filed Aug. 3, 2017, now issued as U.S. Pat. No. 10,126,629 on Nov. 13, 2018, commonly assigned and incorporated by reference herein for all purposes.

BACKGROUND OF THE INVENTION

The present invention relates to optical communication techniques. More particularly, the present invention provides an optical dispersion compensator integrated in a silicon photonics system.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Progress in computer technology (and the continuation of Moore's Law) is becoming increasingly dependent on faster data transfer between and within microchips. Optical interconnects may provide a way forward, and silicon photonics may prove particularly useful, once integrated on the standard silicon chips. 40-Gbit/s and then 100-Gbit/s data rates WDM optical transmission over existing single-mode fiber is a target for the next generation of fiber-optic communication networks. The big hangup so far has been the fiber impairments like chromatic dispersion that are slowing the communication signal down. Chromatic dispersion is a result of the dependence of the refractive index on the wavelength. Different frequency components of the lightwave experience different phase delays due to the refractive index change. The phase difference causes distortion on the signal. Especially for high-speed communication beyond 10 Gbits/s, distortion and attenuation of the optical signals take their toll.

In order to compensate the dispersion in the fiber, traditional method is to use a discrete dispersion compensator formed on Silica-based Planar Lightwave Circuit (PLC). Such traditional device has very large dimension in centimeter range and is not suitable for small package silicon photonics modules. Therefore, an improved dispersion compensator that is compatible with a silicon photonics system is desired.

BRIEF SUMMARY OF THE INVENTION

The present invention relates to optical telecommunication techniques. More particularly, the present invention provides an optical dispersion compensator that is based on an optical filter with small dimension and athermal characteristics directly integrated in a silicon photonics chip for high data rate DWDM optical communications, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides an optical dispersion compensator integrated with a silicon photonics system. The optical dispersion compensator includes a first phase-shifter on a silicon substrate and a second phase-shifter on the silicon substrate. Additionally, the optical dispersion compensator includes a first 2×2 splitter having a first exit port coupled to an input port of the first phase-shifter and a second exit port coupled to an input port of the second phase-shifter and a second 2×2 splitter having a first entry port coupled to an output port of the first phase-shifter and a second entry port coupled to an output port of the second phase-shifter. Furthermore, the optical dispersion compensator includes a third phase-shifter on the silicon substrate having an input port coupled to a first exit port of the second 2×2 splitter and an output port coupled to a first entry port of the first 2×2 splitter to form an optical loop with the first phase-shifter and the second phase-shifter. The second entry port of the first 2×2 splitter is for coupling with an input fiber and the second exit port of the second 2×2 splitter is for coupling with an output fiber. The optical loop is characterized by a total phase delay tunable via each of the first phase-shifter, the second phase-shifter, and the third phase-shifter such that a normal dispersion (>0) at a certain wavelength in the input fiber is substantially compensated and independent of temperature.

In an alternative embodiment, the present invention provides a method for compensating fiber dispersion in a compact device integrated in a system-on-chip. The method includes providing a silicon-on-insulator substrate and forming a first waveguide and a second waveguide embedded in a first cladding material on the silicon-on-insulator substrate. The first waveguide and the second waveguide are optically coupled to each other in parallel and respectively coupled to a first 2×2 coupler and a second 2×2 coupler. Additionally, the method includes forming a window of the first cladding material. Furthermore, the method includes forming third waveguide in the window. The third waveguide is surrounded by a second cladding material filled in the window. The third waveguide is coupled to a first entry port of the first 2×2 coupler and a first exit port of the second 2×2 coupler to form an optical loop with the first waveguide and the second waveguide. Moreover, the method includes coupling a second entry port of the first 2×2 coupler to an input fiber and a second exit port of the second 2×2 coupler to an output fiber. The optical loop is characterized by a total phase delay tunable via each of the first waveguide, the second waveguide, and the third waveguide such that a normal dispersion (>0) at a certain wavelength in the input fiber is substantially compensated and independent of temperature.

In yet another embodiment, the present invention provides an optical dispersion compensator integrated with a silicon photonics system including multiple optical dispersion compensators cascaded in series with each second entry port of a next stage optical dispersion compensator described herein being coupled to the second exit port of a current stage optical dispersion compensator described herein.

In still another embodiment, the present invention provides an optical dispersion compensator integrated with a silicon photonics system. The optical dispersion compensator includes multiple first optical dispersion compensators cascaded in series. Each first optical dispersion compensator includes a pair of first optical filters coupled in parallel in a main path between a first input port and a first output port and multiple optical filter units cascaded in parallel through one pair of 2×2 couplers for each two adjacent optical filter units in a feedback path from the first output port to the first input port. Each of the multiple optical filter units includes a pair of second optical filters coupled in parallel forming a Mach-Zehnder Interferometer. Each first input port of a next stage first optical dispersion compensator is coupled to the first output port of a current stage first optical dispersion compensator. The pair of first optical filters is constrained under an athermal condition that a temperature variation of a first effective index of refraction multiplied by a first length of a first one of the pair of first optical filters therein cancels a temperature variation of a second effective index of refraction multiplied by a second length of a second one of the pair of first optical filters therein. Each Mach-Zehnder Interferometer is constrained under an athermal condition that a temperature variation of a first effective index of refraction multiplied by a first length of a first one of the pair of second optical filters therein cancels a temperature variation of a second effective index of refraction multiplied by a second length of a second one of the pair of second optical filters therein.

In an alternative embodiment, the present invention provides a system-on-chip for a silicon photonics system including a single silicon-on-insulator substrate formed with a dispersion compensator described herein for compensating optical dispersion of a single-mode fiber of a certain length at a certain wavelength of any channel in a broadband for telecommunication.

The present invention achieves these benefits and others in the context of known silicon waveguide laser communication technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention relates to optical telecommunication techniques. More particularly, the present invention provides an optical dispersion compensator that is based on optical filter formed directly on silicon substrate with small dimension and athermal characteristics and fully compatible with silicon photonics system for high data rate DWDM optical communications, though other applications are possible.

Figure 1:
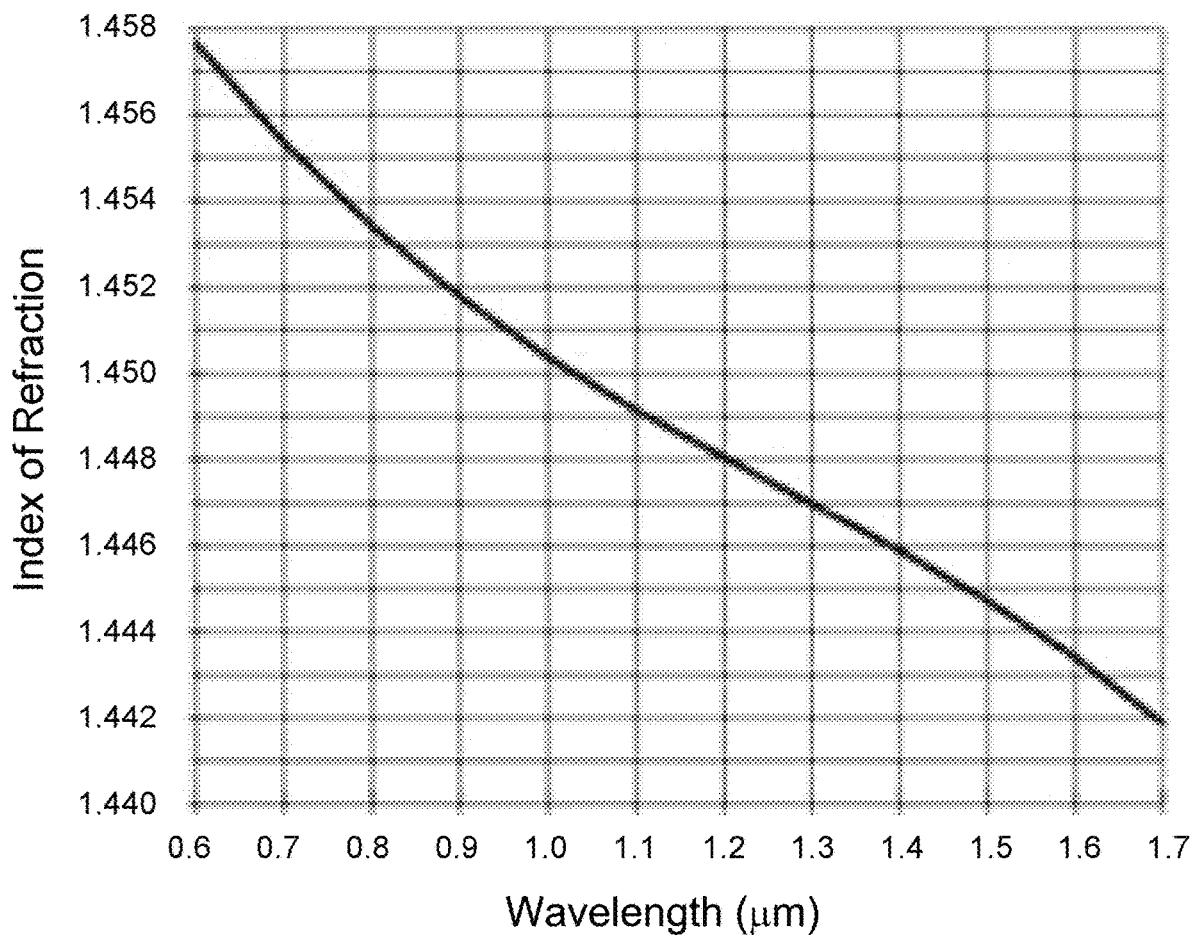
FIG. 1 is a plot of index of refraction for silica material versus wavelength.
Figure 2:
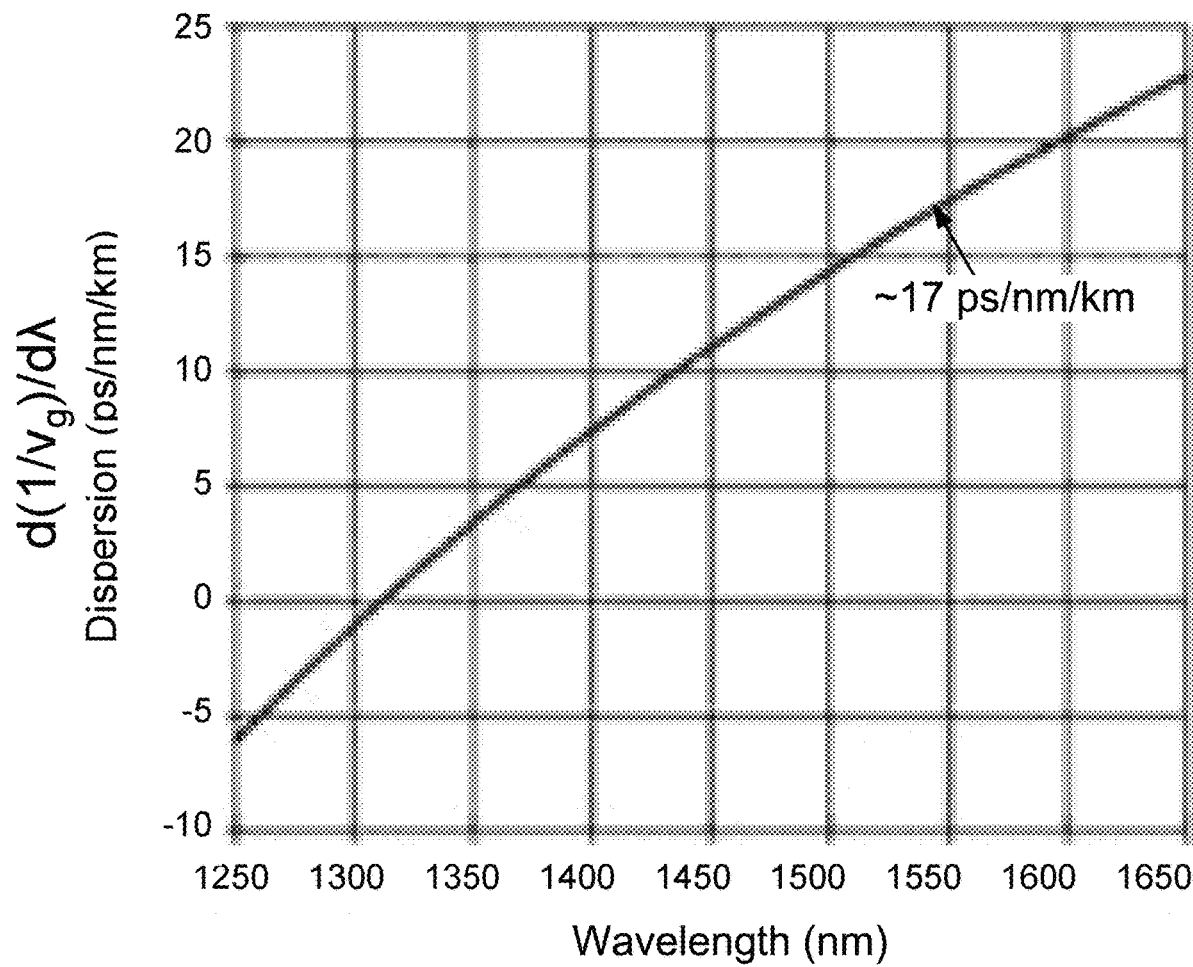
FIG. 2 is a plot of group velocity dispersion of a typical single-mode fiber versus wavelength.
Figure 3:
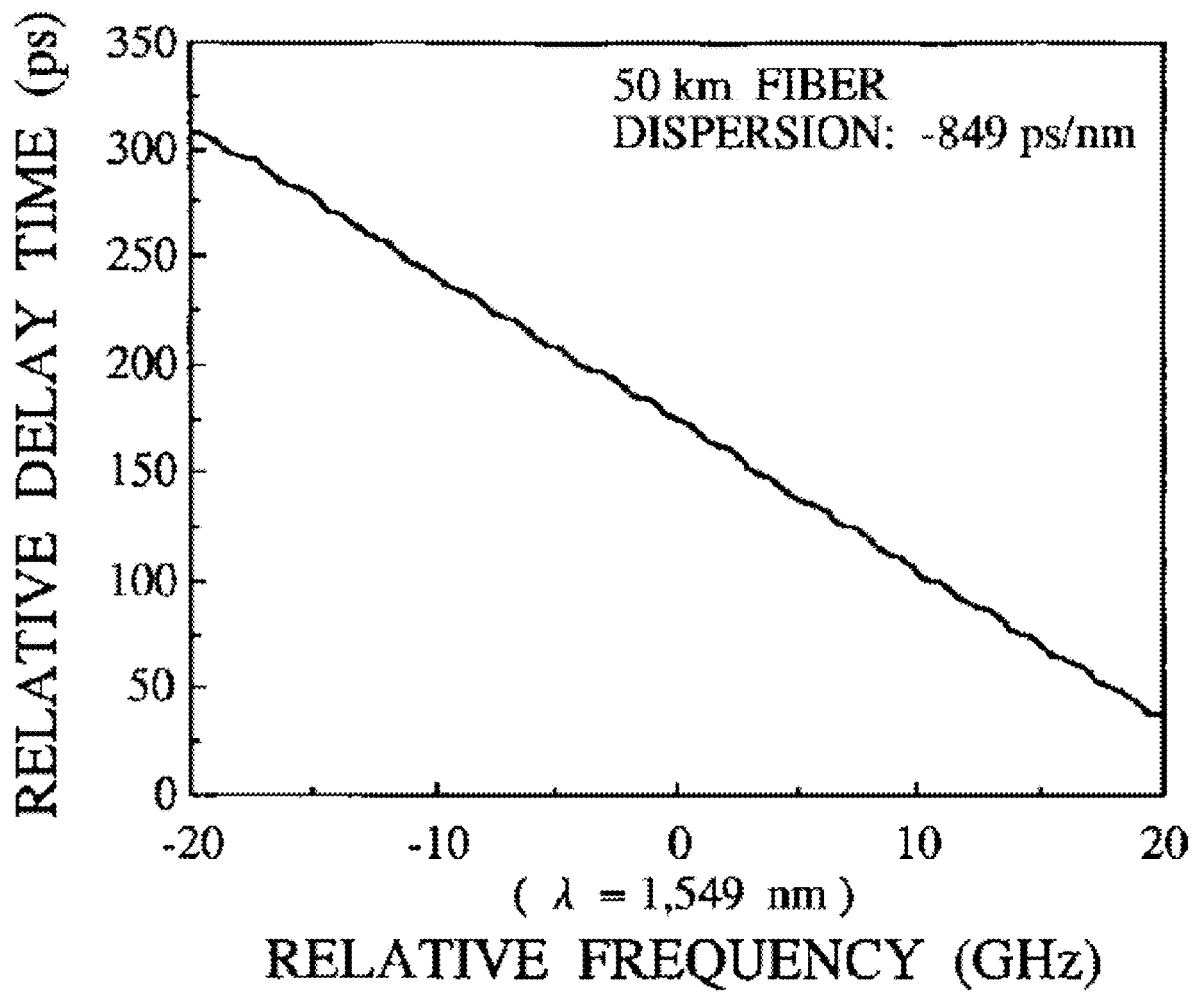
FIG. 3 is a plot or relative delay time due to chromatic dispersion of optical fiber versus a relative change of pulse frequency of the optical signal.

Group velocity dispersion (GVD) is the group delay (inverse of group velocity) dependence of an optical signal on the frequency or wavelength. In the silica material, which is a typical material for optical fiber, as shown in FIG. 1, a shorter wavelength wave has higher effective refractive index and slower group velocity than a longer wavelength wave. When the shorter wavelength wave moves slower than the longer ones in a fiber, the GVD is positive for this fiber, i.e., the fiber suffers a so-called normal GVD. If the GVD of a medium is negative, the dispersion of this medium is an abnormal GVD. FIG. 2 shows a plot of optical dispersion (i.e., GVD) of a single-mode fiber at different wavelength. As shown, for a wavelength of ~1549 nm a normal GVD of ~17 ps/nm/km is obtained for the fiber. In other words, 17 ps delay is results from optical signal pulse after it is transmitted through the optical fiber over 1 km in length, provided that the pulse width of the spectral line of a light source for transmitting the signal is 1 nm.

As the optical signal travels a longer distance along the fiber, the fiber dispersion effect will be accumulated and becomes larger and larger. The signal eventually will be distorted and lost along the way. Based on a dependency of relative time delay on relative frequency shift shown in FIG.

3, when a light wave with a pulse width of 1 nm sent from a light source passes through a 50 km single-mode optical fiber with the nominal GVD of ~17 ps/nm/km, the accumulated dispersion of the fiber at the end of the 50 km will reach 849 ps/nm.

Optical filter in general has variable phase shift responses to the optical waves it is transmitting. So it is possible to use an optical filter configured as a phase equalizer to couple to a single-mode fiber of a certain length for compensating the optical dispersion of the fiber. As the dispersion in the fiber is normal dispersion [e.g., 17 ps/(nm×km) for wavelength under 1550 nm], so in order to compensate the fiber dispersion, an optical filter configured with an abnormal dispersion of a corresponding negative value [e.g., −17 ps/(nm×km)] is needed. The real fiber dispersion that needs to be compensated depends on the length of the fiber.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, entry, exit, clockwise and counter clockwise have been used for convenience purposes only and are not intended to imply any particular fixed direction. Instead, they are used to reflect relative locations and/or directions between various portions of an object.

Figure 4:
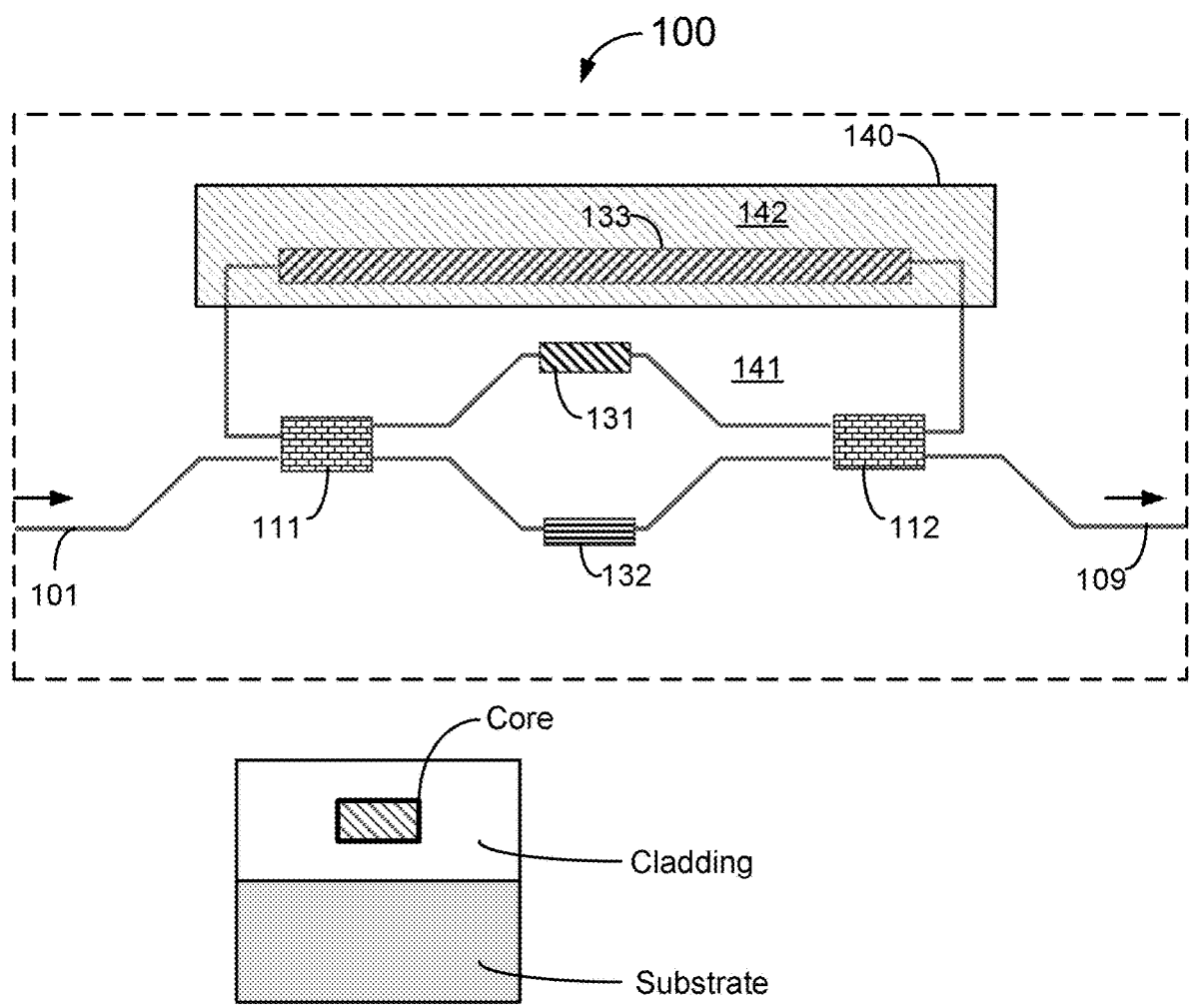
FIG. 4 is a schematic diagram of an optical dispersion compensator based on optical filters formed on silicon according to an embodiment of the present invention.

FIG. 4 is a schematic diagram of an optical dispersion compensator based on an optical filter formed on silicon substrate according to an embodiment of the present invention. This diagram is merely an example, which should not unduly limit the scope of the claims. One of ordinary skill in the art would recognize many variations, alternatives, and modifications. As shown, the optical filter 100 is provided as the optical dispersion compensator formed on a silicon substrate, schematically shown in a cross-section view. Optionally, the silicon substrate is a silicon-on-insulator substrate. The optical dispersion compensator 100 is a device fully integrated in a compact form in a chip. In the embodiment, the optical dispersion compensator 100 includes a first phase-shifter 131 coupled a second phase-shifter 132 optically in parallel. At input side, a first 2×2 splitter 111 is coupled to an input port of each of the first phase-shifter 131 and the second phase-shifter 132. At output side, a second 2×2 splitter 112 is coupled to an output port of each of the first phase-shifter 131 and the second phase-shifter 132. An entry port of the first 2×2 splitter 111 is configured to couple with an input fiber, which needs dispersion compensation for an optical signal of a certain wavelength that has already been transported through the input fiber up to a certain length. An exit port of the second 2×2 splitter 112 is configured to couple with an output fiber for outputting the optical signal after the dispersion compensation. Optionally, the 2×2 splitter is a multimode interference coupler. Optionally, the 2×2 splitter is a directional coupler.

Referring to FIG. 4, the optical dispersion compensator 100 further includes a third phase-shifter 133 having an input port coupled to another exit port of the second 2×2 splitter 112 and an output port coupled to another entry port of the first 2×2 splitter 111 to form an optical loop with the first phase-shifter 131 and the second phase-shifter 132. Optionally, the optical loop is a feedback loop, which allows a portion of optical signal outputted at the output side to go through the third phase-shifter 133 and feedback to the input side again. This optical feedback loop effectively creates a path for tuning total phase delay to be associated with a negative dispersion required for compensating normal dispersion of the optical signal of the certain wavelength caused by the optical fiber of the certain length.

Optionally the first phase-shifter 131 is a first waveguide formed on the silicon substrate and the second phase-shifter 132 is a second waveguide formed on the same silicon substrate. Optionally, the second waveguide coupled with the first waveguide in parallel with a relative phase delay to form a Mach-Zehnder interferometer. Optionally, the third phase-shifter 133 is a third waveguide formed on the same silicon substrate.

Optionally, the first waveguide 131 comprises a first core material with a first index of refraction $n_1$ and an elongated shape of the first length $L_1$ embedded in a first cladding material 141 on the silicon substrate. In a cross-section view, an example of a waveguide is shown with a core material in a typical rectangular shape embedded in a cladding material overlying a substrate. The cladding material usually has an index of refraction smaller than that of the core material so that the light can be confined substantially inside the geometry of the core of the waveguide. A combination effect of the waveguide core with a certain geometric shape and respective dimensions and the corresponding indices of refraction for both the first core material and the first cladding material, a first phase delay for the optical signal of the certain wavelength passing the first phase-shifter 131 is yielded. Similarly, the second waveguide 132 includes a second core material with a second index of refraction $n_2$ and an elongated shape of the second length $L_2$ embedded in the first cladding material 141 formed on the same silicon substrate. A second phase delay for the optical signal of the certain wavelength passing the second phase-shifter 132 is yielded. The second phase delay may be different from the first phase delay. Optionally, the first waveguide and the second waveguide coupled in parallel with a relative phase delay to form a Mach-Zehnder interferometer. Overall physical length of the Mach-Zehnder interferometer including both 2×2 splitters 111 and 112 can be made quite compact. For example, the length of the dispersion compensator 100 can be just about 100 µm.

In an embodiment, the third waveguide 133 includes a third core material with a third index of refraction $n_3$ and an elongated shape of the third length $L_3$ embedded in a second cladding material 142. The second cladding material 142 does not formed directly on the silicon substrate. Optionally, a window of the first cladding material 141 is created after the first cladding material is formed on the silicon substrate. The second cladding material 142 is filled in the window of the first cladding material 141. The third waveguide 133 is embedded within the second cladding material which is still chosen to have a smaller index of refraction than the third index of refraction for confining light inside the core material therein. Accordingly, the third phase delay for the optical signal of the certain wavelength passing the third phase-shifter 133, which is set into an optical feedback loop, is yielded.

In an embodiment, a total phase delay of the optical dispersion compensator 100 is a manifestation of the first phase delay, the second phase delay, and the third phase delay associated with the structure provided by the Mach-Zehnder interferometer formed by the first waveguide 131 and the second waveguide 132 and the optical feedback loop formed by coupling the third waveguide 133 to the Mach-Zehnder interferometer. Each of the first waveguide, the second waveguide, and the third waveguide can be independently fabricated and tuned with material and geometry selections. Optionally, a heating element can be installed to be around each waveguide to tune the index of refraction by changing temperature. As a result of tuning the first waveguide, the second waveguide, and the third waveguide as well as properly selecting the corresponding first and second cladding materials under the structure described herein, an abnormal dispersion (<0) for the certain wavelength can be achieved. The dispersion compensator 100 is directly integrated in a silicon chip with compact dimensions.

Figure 5:
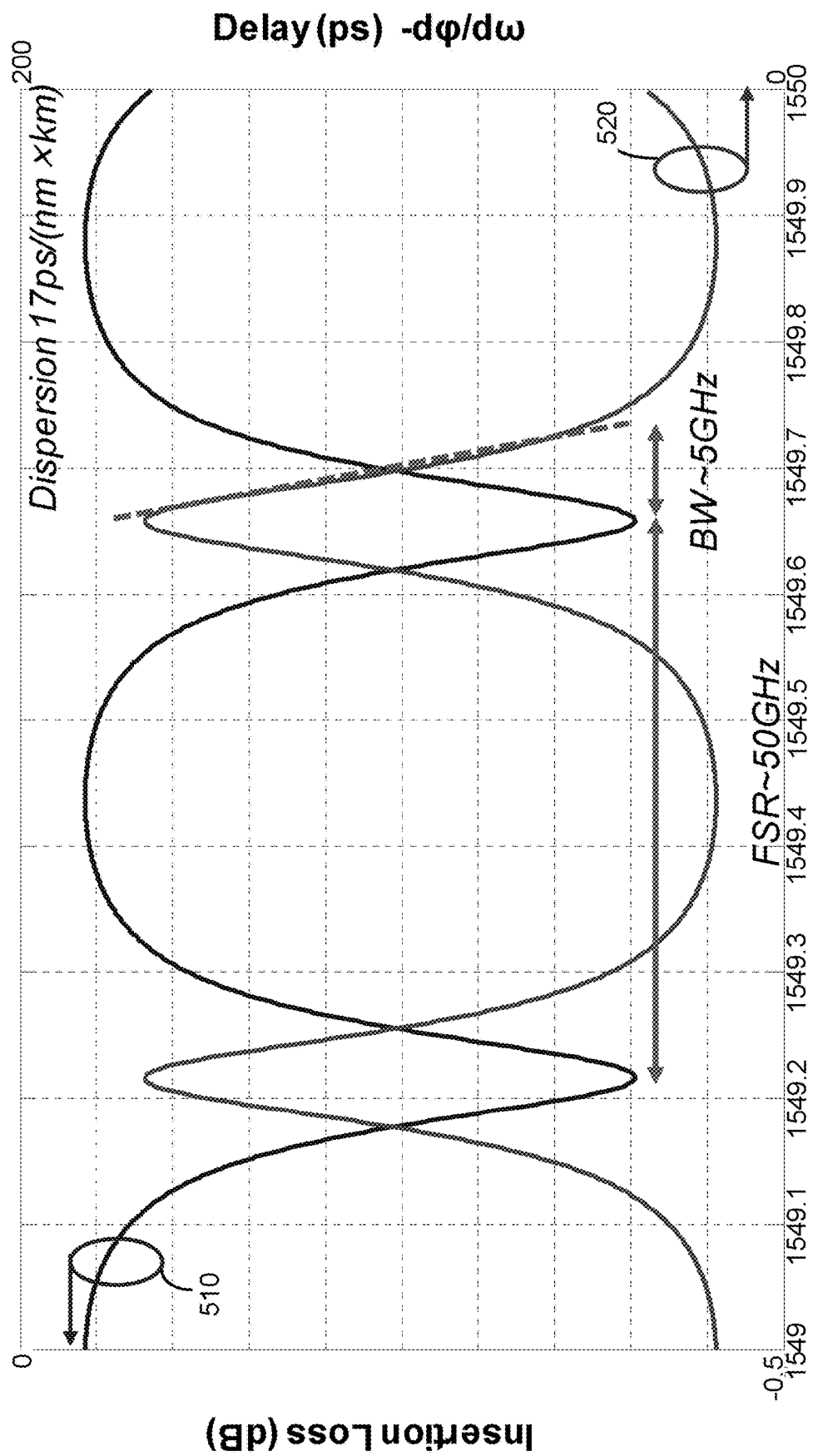
FIG. 5 is a result of a phase response of an optical dispersion compensator according to an embodiment of the present invention.

FIG. 5 is a result of a phase response of an optical dispersion compensator according to an embodiment of the present invention. This diagram is merely an example, which should not unduly limit the scope of the claims. One of ordinary skill in the art would recognize many variations, alternatives, and modifications. In an example, the fiber dispersion is assumed to be ~17 ps/nm/km for a signal of a wavelength of ~1549.7 nm. A dispersion characteristics of a dispersion compensator based on the embodiment of the present disclosure is plotted. As shown in FIG. 5, in a wavelength range from 1549 nm to 1550 nm, a change of phase delay curve 520 versus wavelength around 1549.7 nm yields a negative slope of −2166 ps/nm over a bandwidth of 5 GHz. This dispersion compensator thus is able to compensate the normal dispersion of a signal at the wavelength 1549.7 nm traveling over the fiber in a length of 2166/17=127 km. In the same figure, a change of insertion loss of the signal versus wavelength is also plotted, showing the insertion loss is well controlled below 0.5 dB. At the specific wavelength 1549.7 nm, the insertion loss is only 0.25 dB. The figure also shows a free-spectrum range (FSR) value of 50 GHz is yielded, giving possibility for the same dispersion compensator to compensate optical signal in different channel wavelengths in a broad band allowed by the FSR. Optionally, the dispersion compensator is designed with a single optimized signal wavelength. For compensating multiple signals with different wavelengths, usually multiple dispersion compensator are separately employed, though at least certain numbers of different dispersion compensators for different wavelengths can be still fabricated on a single silicon substrate, with feasibility to be integrated in multi-channel DWDM silicon photonics system.

In some embodiments, tuning the first waveguide, the second waveguide, and the third waveguide can done both during their fabrication and afterward. Optionally, during the fabrication, the core material and cladding material of each waveguide can be properly selected for achieving different value of the phase delay. Optionally, the core material of each waveguide can be one selected from single crystal silicon, poly-crystal silicon, SiN, $Si_3N_4$, SiON, silicon germanium alloy ($Si_xGe_{1-x}$), or other materials compatible with the silicon-on-insulator substrate. Optionally, the core material for the first waveguide 131, the second waveguide 132, and the third waveguide 133 is the same. Optionally, the core material for the first waveguide 131 is different from that for the second waveguide 132. The first cladding material 141 can be one selected from $SiO_2$, SiN, $Si_3N_4$, SiON, Air, silicon germanium alloy ($Si_xGe_{1-x}$), and indium tin oxide.

In some embodiments, the core of each waveguide can be formed variably with a length and cross-section shape. Optionally, the core can be formed with a cross-sectional shape in rectangular, a simple channel waveguide. Or the core can be formed in complex shape such as a combination of two rectangular shapes. For example, a rib waveguide having a smaller rectangle on top of a wider rectangle, a slot-channel waveguide having two rectangles in parallel separated by a small gap, a slot-rib waveguide having a slot-channel on top of a wider rectangle, and a multi-channel waveguide having two rectangles stacking together. In another example, a triangle shape waveguide can be provided. Optionally, different structures can be designed for the first waveguide 131 and the second waveguide 132 in order to realize different effective indice of refraction and to keep the combination of the first waveguide 131 and the second waveguide 132 an athermal phase-shifter.

Figure 6:
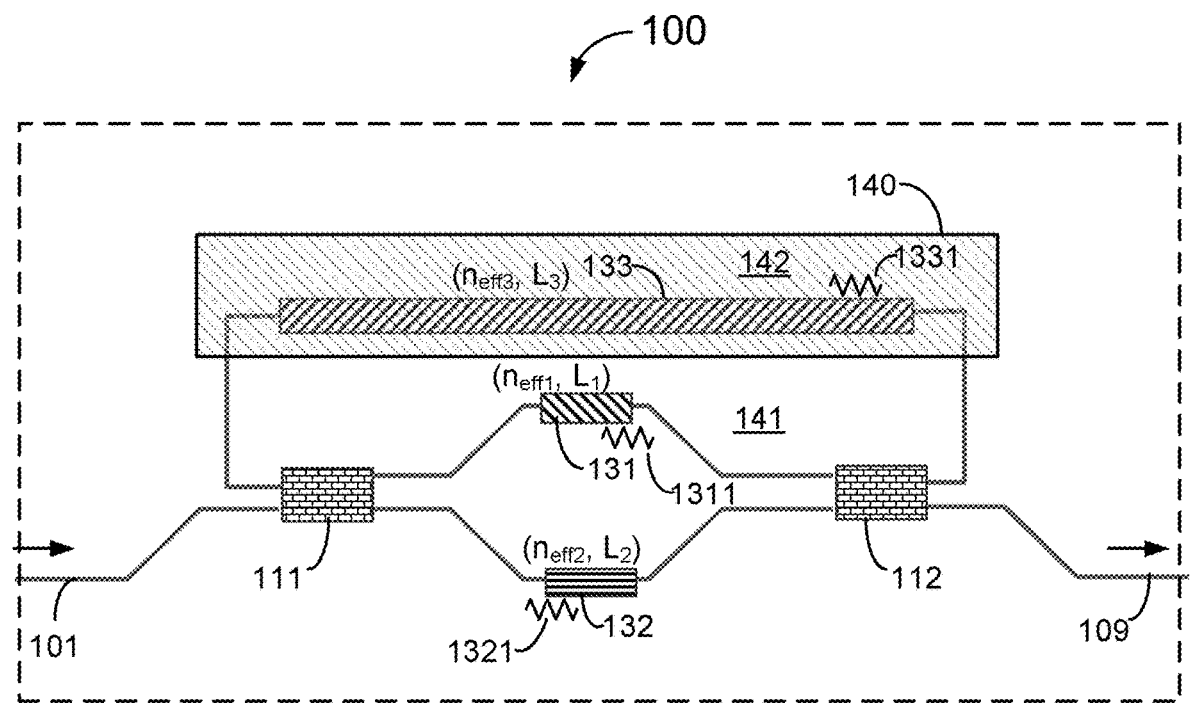
FIG. 6 is a schematic diagram of the optical dispersion compensator in an athermal configuration according to a specific embodiment of the present invention.

In some embodiments, the optical dispersion compensator 100 is tunable in temperature for achieving certain value for proper dispersion compensation and is an athermal dispersion compensator that is independent from environmental temperature change. FIG. 6 is a schematic diagram of the optical dispersion compensator 100 in an athermal configuration according to a specific embodiment of the present invention. Referring to FIG. 6, firstly, in the dispersion compensator 100, each waveguide can be formed to have a heating element attached so that its index of refraction can be tuned by changing the temperature thereof. For example, a heating element 1311 is associated with the first waveguide 131. A heating element 1321 is attached with the second waveguide 132. Optionally, only one heating element is needed for the unit of the first waveguide 131 and the second waveguide 132. A heating element 1331 is disposed next to the third waveguide 133. This allows each waveguide to be tunable after its fabrication on the silicon substrate has been done. By changing the index of refraction of each waveguide, a corresponding phase delay of the waveguide-based phase-shifter is changed. Of course, the heating element, which is typically a resistor based device, has its own physical limit or tuning range though it does not limit the claimed feature herein.

Secondly, in the dispersion compensator 100, two main units in the optical loop, including the Mach-Zehnder interferometer formed by the first phase-shifter 131 and the second phase shifter 132, and the third phase-shifter 133 via the two 2×2 splitters, are constrained respectively in athermal conditions. Referring to FIG. 6, each phase-shifter is a waveguide formed with a core of a certain shape and a length within a cladding, which can be characterized by an effective index of refraction $n_{eff}$ and a length L. The effective index of refraction of the phase-shifter depends on the shape the core, the indices of refraction of both the core material and the cladding material, and other properties such as optical-thermal coefficient, mode structure associated with the geometry, wavelength and polarization mode of signals, etc. For example, the first phase-shifter 131 is characteristically marked with ($n_{eff1}$, $L_1$). Similarly, the second phase-shifter 132 is marked with ($n_{eff2}$, $L_2$) and the third phase-shifter 133 is marked with ($n_{eff3}$, $L_3$). For the Mach-Zehnder interferometer formed by the first phase-shifter 131 and the second phase shifter 132, the athermal condition is to ensure that a temperature variation of a first effective index of refraction $n_{eff1}$ multiplied by a first length $L_1$ of the first phase-shifter cancels a temperature variation of a second effective index of refraction $n_{eff2}$ multiplied by a second length $L_2$ of the second phase-shifter. This is represented by an equation (1) below:

$$\frac{dn_{eff1}}{dT}L_1 - \frac{dn_{eff2}}{dT}L_2 = 0 \quad (1)$$

For the third phase-shifter 133, in some embodiment, it is set under an athermal condition by itself such that its effective index of refraction is temperature independent. This is represented by another equation (2):

$$\frac{dn_{eff3}}{dT} = 0 \quad (2)$$

Practically, the second cladding material used to surround the third waveguide core needs to be properly selected. Optionally, the core of the third waveguide 133 can be one material selected from single crystal silicon, poly-crystal silicon, SiN, $Si_3N_4$, SiON, and silicon germanium alloy ($Si_xGe_{1-x}$), similar to that for forming the first or second waveguide cores. However, the second cladding material needs to be selected with a thermal optical coefficient in an opposite sign compared to that of the third waveguide core. For example, if a core material of silicon is used to form the third waveguide which has a positive thermal-optical coefficient of $+1.84 \times 10^{-4}$/K (as other typical material for waveguide core), the cladding material must have a negative thermal-optical coefficient. Optionally, one such material selected from Polymethyl Methacrylate (PMMA) and Potassium Aluminophosphate glass (KAP) is used for forming the second cladding material 142 which is filled into the window in the first cladding material 141. PMMA has a thermal-optical coefficient of $-1.1 \times 10^{-4}$/K. KAP has a thermal-optical coefficient of $-0.92 \times 10^{-4}$/K.

In general, the dispersion compensator provided in the present disclosure can be duplicated as a whole and cascaded in series multiple times to have an accumulated dispersion for compensating larger dispersion of a longer input fiber. Multiple different dispersion compensators tuned for different wavelengths can be separately integrated in a multi-channel silicon photonics system.

In some embodiments, a unit of the first phase-shifter 131 and the second phase-shifter 132 including at least the first 2×2 splitter 111 can be used as a duplicate phase-shifter unit. The duplicate phase-shifter unit can be cascaded in series multiple times in lower branch of the optical loop that couples with the third phase-shifter 133 to form a different dispersion compensator for achieving different values in total phase delay. Optionally, each of those duplicate phase-shifter units is constrained under the athermal condition that a temperature variation of a first effective index of refraction multiplied by the first length of the first phase-shifter therein cancels a temperature variation of a second effective index of refraction multiplied by the second length of the second phase-shifter therein.

Figure 7:
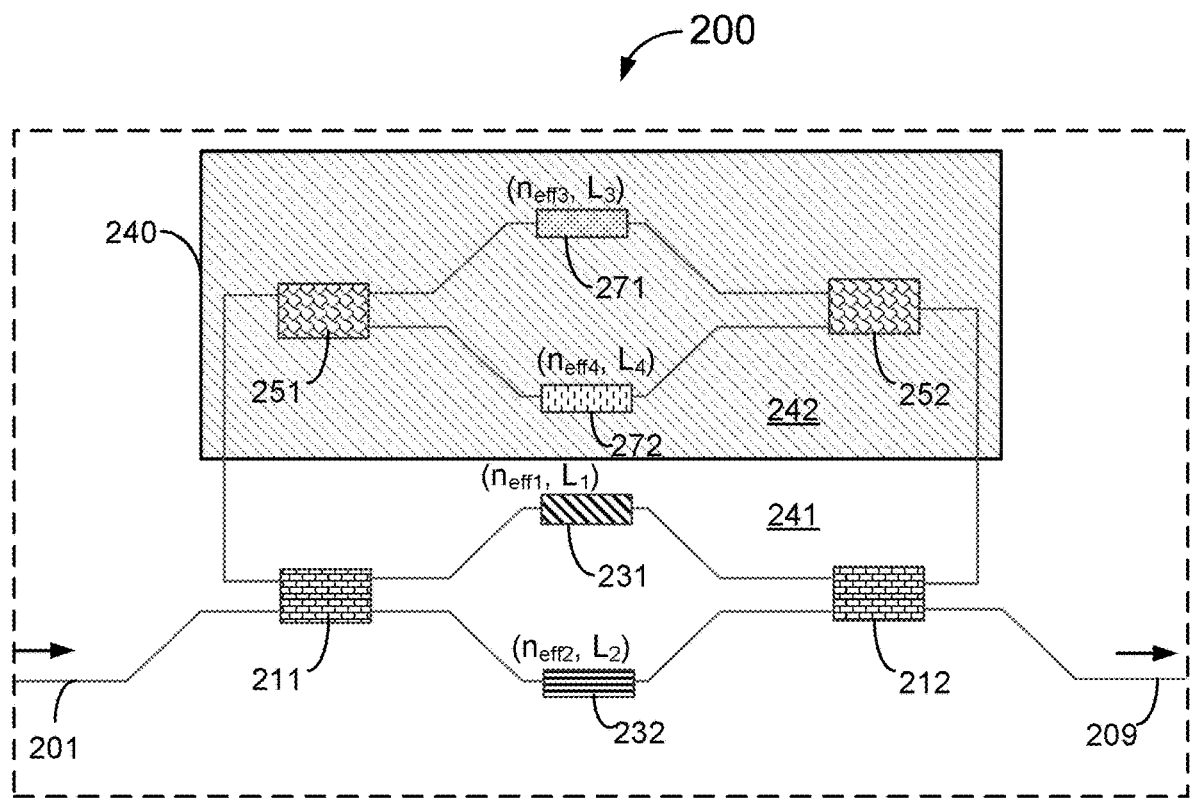
FIG. 7 is a schematic diagram of the optical dispersion compensator in an athermal configuration according to another specific embodiment of the present invention.

In some embodiments, the third phase-shifter includes at least two waveguides configured couple to each other in parallel. FIG. 7 shows an example of the embodiments of the optical dispersion compensator of the present disclosure. As shown, the optical dispersion compensator 200 has a first phase-shifter 231 and a second phase-shifter 232 configured the same way as those in the optical dispersion compensator 100 using a first 2×2 splitter 211 at the input side and a second 2×2 splitter 212 at the output side. The third phase-shifter 133 in the optical dispersion compensator 100 is replaced by a unit of a third phase-shifter 271 and a fourth phase shifter 272 coupled to each other in parallel. The coupled third phase-shifter 271 and the fourth phase shifter 272 still forms an optical loop via a first 1×2 coupler 251 to couple with an entry port of the first 2×2 splitter 211 and a second 2×1 coupler 252 to couple with an exit port of the second 2×2 splitter. Optionally, each of the first 2×2 splitter 211, the second 2×2 splitter 212, the first 1×2 coupler 251, and the second 2×1 coupler 252 is a MMI coupler or a directional coupler.

Optionally, every phase-shifter in the optical dispersion compensator 200 is a waveguide formed on a same silicon substrate. Optionally, the first phase-shifter 231 is a first waveguide surrounded by a first cladding 241 on the silicon substrate characterized by two key parameters i.e., a first effective index of refraction $n_{eff1}$ and a first length $L_1$, and the second phase-shifter 232 is a second waveguide surrounded by the same first cladding 241 on the silicon substrate characterized by a second effective index of refraction $n_{eff2}$ and a second length $L_2$. Optionally, the unit of the first phase-shifter and the second phase-shifter coupled in parallel is configured to be an athermal unit, satisfying the condition that a temperature variation of the first effective index of refraction $n_{eff1}$ multiplied by the first length $L_1$ of the first phase-shifter cancels a temperature variation of the second effective index of refraction $n_{eff2}$ multiplied by the second length $L_2$ of the second phase-shifter.

Optionally, the third phase-shifter 271 is a third waveguide formed in a window of the first cladding material 241 filled by a second cladding material 242. Optionally, the fourth phase-shifter 272 is a duplicate waveguide the same as the third phase-shifter 271 having substantially the same structure and optical-thermal properties and embedded in the same (second) cladding 242. Optionally, the second cladding 242 is the same as the first cladding 241 so that no window formation in the first cladding 241 is needed. The unit of the two duplicated waveguides ensures that it is automatically an athermal unit. In another embodiment, the fourth phase-shifter 272, characterized similarly by two key parameters ($n_{eff4}$, $L_4$), is a different waveguide yet embedded the same (second cladding as the third phase-shifter 271 characterized by ($n_{eff3}$, $L_3$). Optionally, a proper selection of core materials and geometries of the two waveguides in the second cladding can still ensure that the unit of the third phase-shifter and the fourth phase-shifter coupled in parallel is an athermal unit, i.e., a temperature variation of the effective index of refraction $n_{eff3}$ multiplied by the length $L_3$ of the third phase-shifter 271 cancels a temperature variation of the effective index of refraction $n_{eff4}$ multiplied by the length $L_4$ of the fourth phase-shifter 272. Yet, the difference of the unit of the third phase-shifter and the fourth phase-shifter coupled in parallel in the dispersion compensator 20 versus the third phase-shifter 133 in the dispersion compensator 100 will likely result different phase delay and different effect of temperature tuning if a heating element is installed in each unit.

In an alternative embodiment, the unit of the third phase-shifter and the fourth phase-shifter coupled in parallel can be used as a duplicate unit and cascaded in parallel multiple times to achieve different values of total phase delay of the optical dispersion compensator. Yet, as more units are cascaded, each of all units are coupled to each previous unit including the unit of the first phase-shifter and the second phase-shifter using two 2×2 couplers (like 211 and 212) except that the last unit is coupled to the second-to-the-last unit using two 1×2 couplers (like 251 and 252).

Figure 8:
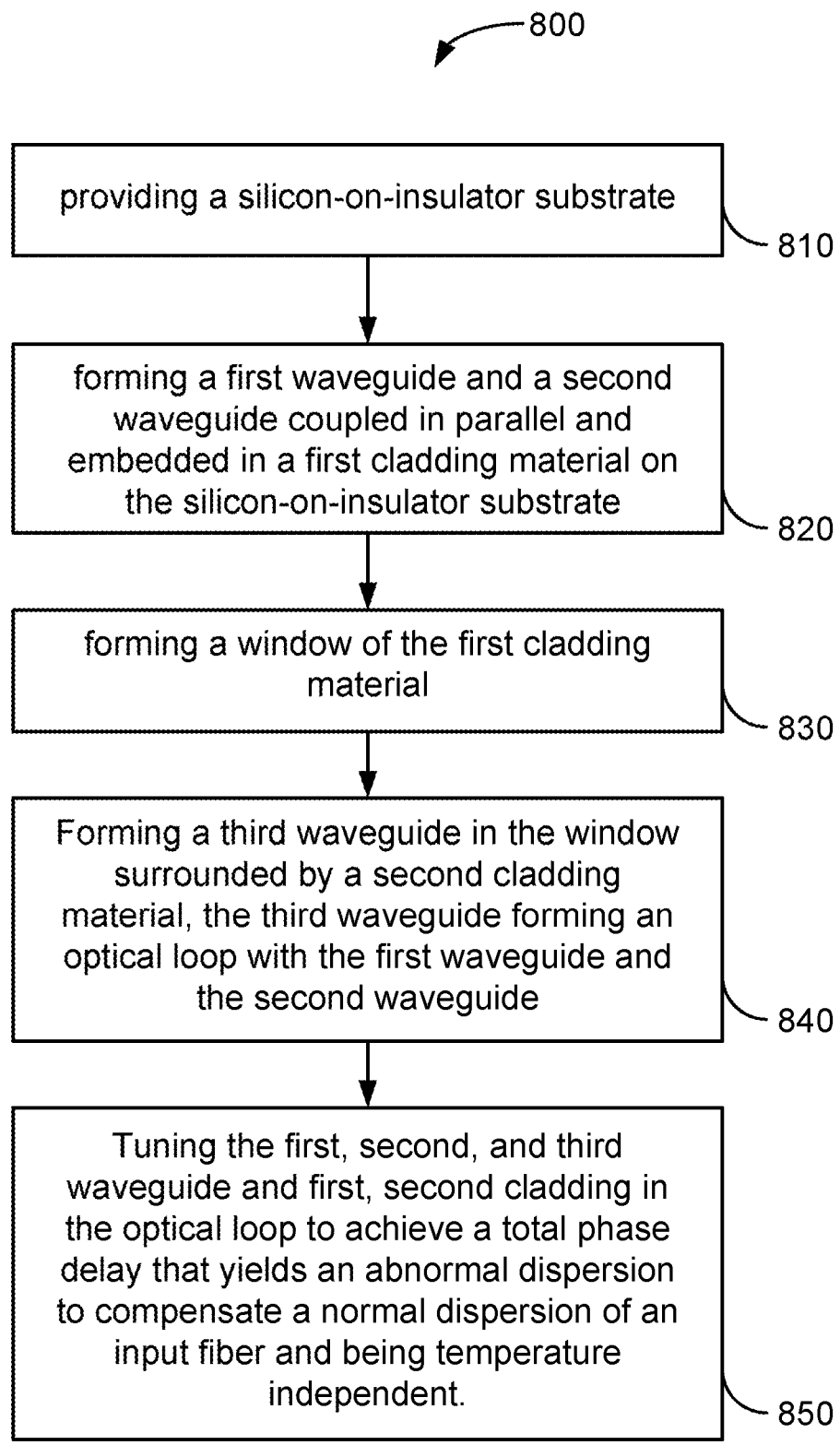
FIG. 8 is flow chart showing a method for compensating fiber dispersion in a compact device integrated in a system-on-chip according to an alternative embodiment of the present invention.

In another aspect, the present disclosure provides a method for compensating dispersions in optical fiber in a compact device that is integrated in a system-on-chip. FIG. 8 is flow chart showing a method for compensating fiber dispersion in a compact device integrated in a system-on-chip according to an alternative embodiment of the present invention. This diagram is merely an example, which should not unduly limit the scope of the claims. One of ordinary skill in the art would recognize many variations, alternatives, and modifications. Referring to FIG. 8, the method 800 includes a process 810 of providing a silicon-on-insulator substrate. This substrate has been used for integrating various kinds of silicon photonics systems including DWDM module, transceiver module, opto-electric control module, polarization converter, photodetector, etc and can be used for integrating one or more dispersion compensator in the same substrate.

In the embodiment, the method 800 includes a process 820 for forming a first waveguide and a second waveguide coupled in parallel and embedded in a first cladding material on the silicon-on-insulator substrate. In the process, each of the first waveguide and the second waveguide can have their input ports coupled to a first 2×2 splitter at an input side. One entry port of the 2×2 splitter is able to couple directly to an input fiber to receive the optical signal that has accumulated dispersion after being transported through a certain substantial length of the input fiber. The two output ports of the first waveguide and the second waveguide are coupled to a second 2×2 splitter at an output side with one exit port being coupled to an output fiber (configured to output the optical signal after dispersion compensation).

Optionally, the process of forming the first waveguide and the second waveguide includes forming at least a heating element thereof configured to tune phase delays of the first waveguide and the second waveguide independently.

Optionally, the process of forming the first waveguide and the second waveguide further comprises selecting proper core materials and lengths respectively for the first waveguide and the second waveguide and cladding material for the first cladding material such that a combination of the first waveguide and the second waveguide is constrained to an athermal condition that a temperature variation of a first effective index of refraction multiplied by a first length of the first waveguide cancels a temperature variation of a second effective index of refraction multiplied by a second length of the waveguide. As a result, the unit of the first waveguide and the second waveguide coupled in parallel forms an athermal Mach-Zehnder Interferometer with respective tunable phase delay.

In the embodiment, the method 800 further includes a process 830 for forming a window in the first cladding material on the silicon-on-insulator substrate. Optionally, the first cladding material is silicon dioxide. Furthermore, the method includes a process 840 for forming a third waveguide surrounded by a second cladding material that is filled into the window. Optionally, the third waveguide is configured to coupled respectively to another entry port of the first 2×2 splitter and another exit port of the second 2×2 splitter to form an optical loop with the first waveguide and the second waveguide. The optical loop is a feedback loop to allow partial signal out of the second 2×2 splitter to return through the third waveguide to the input side. The optical loop structure provides a basis of manifestation of the three waveguides to yield an abnormal dispersion (<0) that is able to compensate the normal dispersion caused by a certain length of single-mode fiber.

Accordingly, the method 800 includes a process 850 for tuning the first, second, and third waveguide and first, second cladding in the optical loop to achieve a total phase delay that yields an abnormal dispersion to compensate a normal dispersion of an input fiber and being temperature independent. Optionally, the second cladding material is chosen to have a thermal-optical coefficient with an opposite sign of that of the core material of the third waveguide. Therefore, the third waveguide itself can be configured to be an athermal phase-shifter that keeps the temperature variation of its effective index of refraction substantially at zero. Since the unit of the first waveguide and the second waveguide coupled in parallel also forms an athermal Mach-Zehnder Interferometer. The optical dispersion compensator formed above is able to compensate the fiber dispersion at a certain wavelength substantially temperature independent.

Optionally, the method of forming the third waveguide further includes forming a combined phase-shifter including two waveguides coupled to each other in parallel. The two waveguides are respectively coupled with the first entry port of the first 2×2 splitter via a first 1×2 splitter and the first exit port of the second 2×2 splitter via a second 2×1 splitter to form an optical loop. The two waveguides are either two identical ones or constrained under an athermal condition that a temperature variation of a first effective index of refraction multiplied by a first length of a first one of the two waveguides cancels a temperature variation of a second effective index of refraction multiplied by a second length of a second one of the two waveguides therein.

Optionally, the method also includes cascading in series multiple units of the first waveguide and the second waveguide in the optical loop with the third waveguide for achieving different values of total phase delay. Each unit of the first waveguide and the second waveguide is coupled in parallel to each other and still satisfied the athermal condition.

Optionally, the method also includes cascading in parallel multiple units of the combined phase-shifter in the optical loop with the first waveguide and the second waveguide for achieving different values of total phase delay. Each unit of the combined phase-shifter is constrained under the athermal condition.

Figure 9:
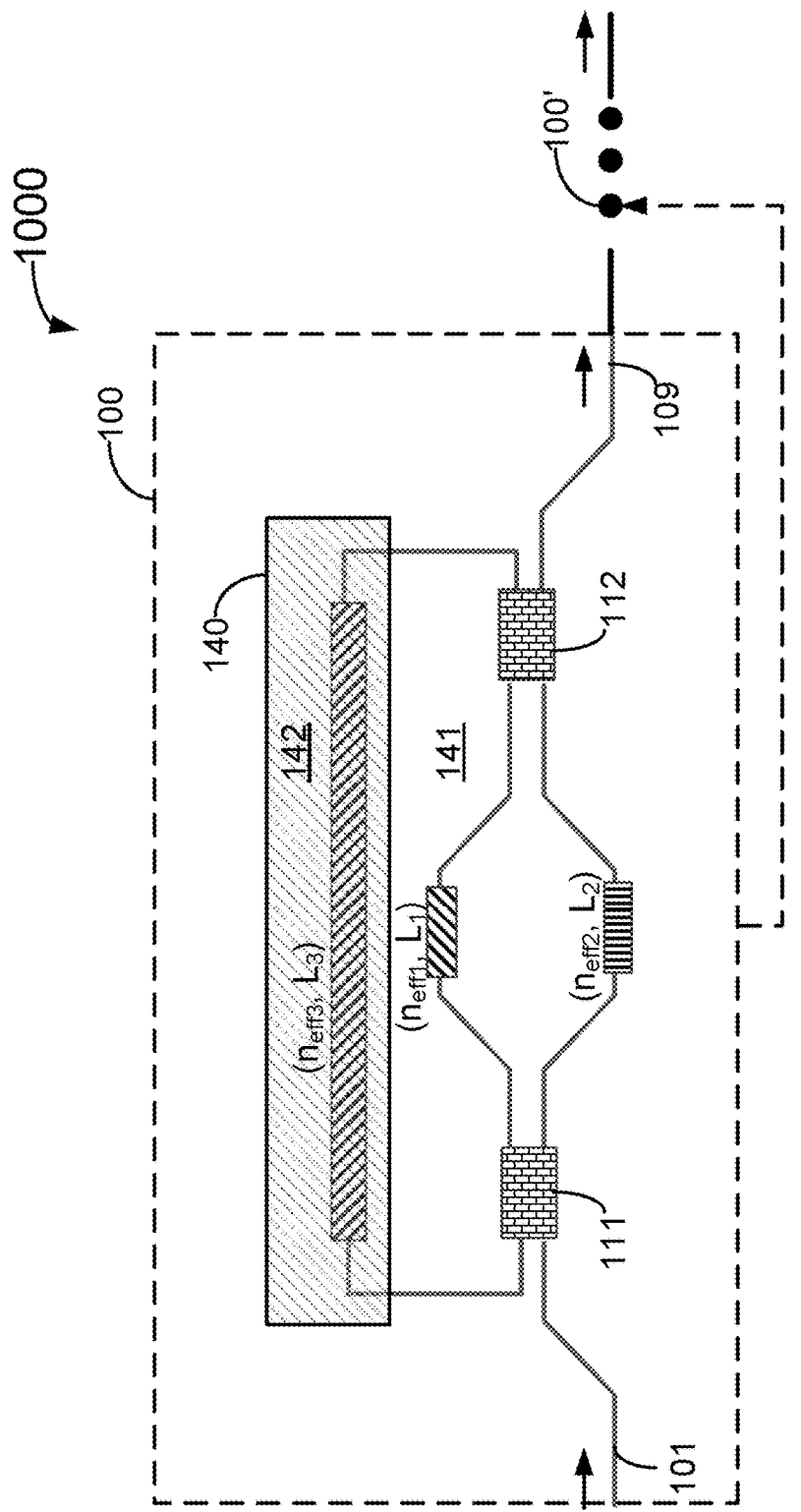
FIG. 9 is a schematic diagram of an optical dispersion compensator in an athermal configuration cascaded in whole according to an alternative embodiment of the present invention.

In some embodiments, the optical dispersion compensator in an athermal configuration described herein can be cascaded in whole or part, in one direction or both direction, in series or in parallel. FIG. 9 is a schematic diagram of an optical dispersion compensator in an athermal configuration cascaded in whole according to an alternative embodiment of the present invention. This diagram is merely an example, which should not unduly limit the scope of the claims. One of ordinary skill in the art would recognize many variations, alternatives, and modifications. As shown, the optical dispersion compensator 100 is substantially the same one described in FIG. 6. In the embodiment, the optical dispersion compensator 1000 is formed by cascading multiple optical dispersion compensator 100 one after another in series. In particular, another optical dispersion compensator 100', which does not have to exactly the same as the optical dispersion compensator 100, is coupled to the optical dispersion compensator 100. Subsequently, another optical dispersion compensator 100" can be coupled to the optical dispersion compensator 100', and so on. Optionally, each optical dispersion compensator 100 in the series is configured to be in an athermal condition defined by formula (1) and (2). Overall, the optical dispersion compensator 1000 can achieve different phase shift that is suitable for compensating different dispersion of optical fiber in different length or different working environment.

Figure 10:
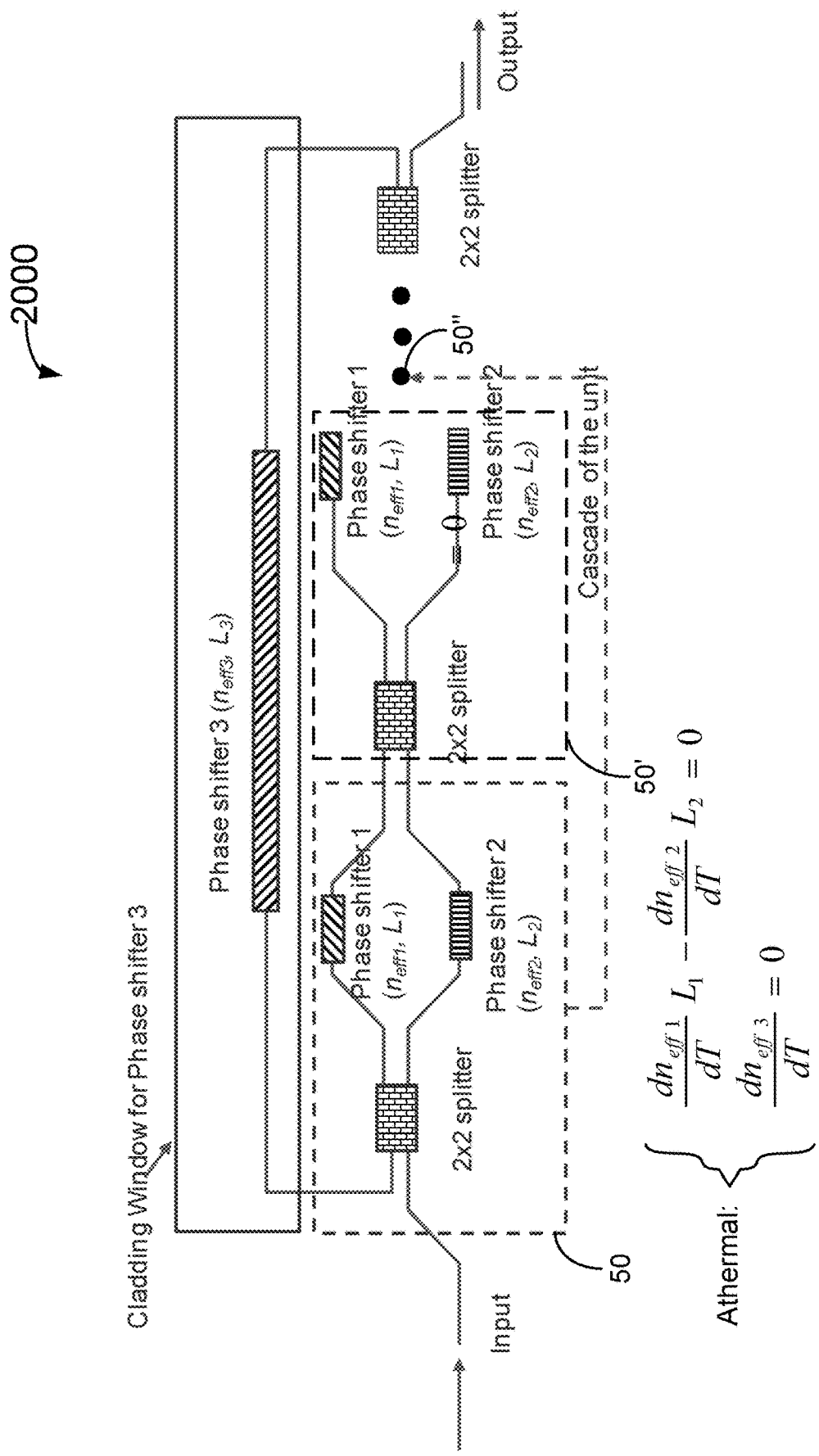
FIG. 10 is a schematic diagram of an optical dispersion compensator in an athermal configuration cascaded in part according to an alternative embodiment of the present invention.

FIG. 10 is a schematic diagram of an optical dispersion compensator in an athermal configuration cascaded in part according to an alternative embodiment of the present invention. This diagram is merely an example, which should not unduly limit the scope of the claims. One of ordinary skill in the art would recognize many variations, alternatives, and modifications. As shown, the optical dispersion compensator 2000 includes a cascaded in part main branch and a feedback branch. In the main branch, a part 50 including a single 2×2 splitter and two phase shifters (phase shifter 1 and phase shifter 2) is a similar part of the optical dispersion compensator 100 of FIG. 6. The part 50, each can be formed with an athermal condition restricted by the formula (1), is selected to a unit for cascading one after another in series only within the main branch. The feedback branch having one phase shifter 3 remains the same as that in FIG. 6 with an athermal condition restricted by the formula (2). In other words, a similar unit 50' is coupled via a 2×2 splitter to the unit 50, and optionally another similar unit 50" is coupled to the unit 50' in a similar manner, and so on in the main branch, while the feedback branch keeps the same as that in FIG. 6.

Figure 11:
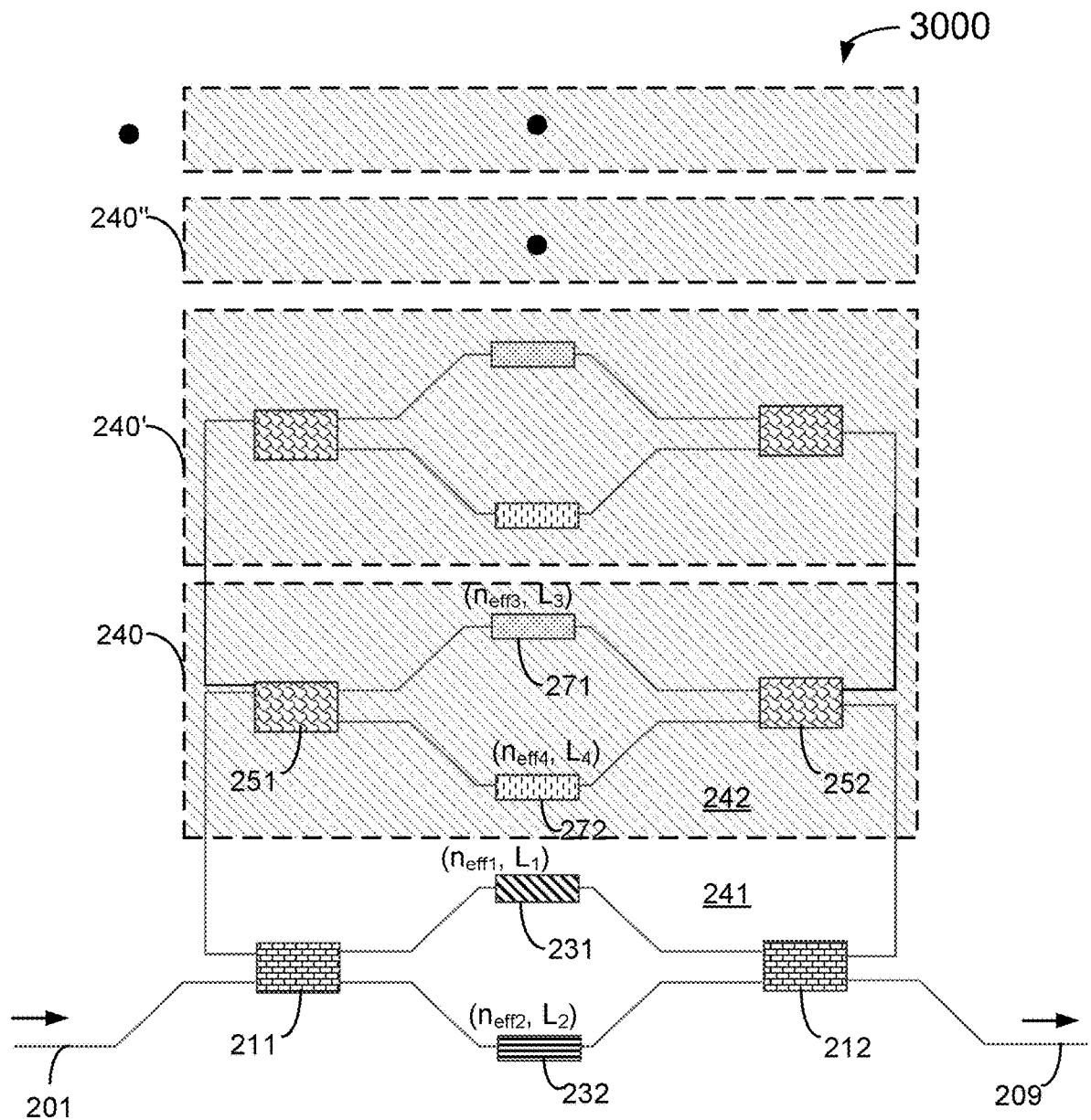
FIG. 11 is a schematic diagram of an optical dispersion compensator in an athermal configuration cascaded in part according to another alternative embodiment of the present invention.

FIG. 11 is a schematic diagram of an optical dispersion compensator in an athermal configuration cascaded in part according to another alternative embodiment of the present invention. This diagram is merely an example, which should not unduly limit the scope of the claims. One of ordinary skill in the art would recognize many variations, alternatives, and modifications. As shown, the optical dispersion compensator 3000 is formed by cascading one or more feedback part 240 of the optical dispersion compensator 200 (FIG. 7). Optionally, each cascading unit 240 is an athermal MZ interferometer satisfying the formula (1) for its two sub-branches. Optionally, after a first feedback part 240, a second feedback part 240' is coupled to the first feedback part 240 via a couple of 2×2 couplers like those couplers 251 and 252. Then, optionally a third feedback part 240" can be coupled to the second feedback part 240', and so on. All the cascaded units can be kept in an athermal condition individually.

Figure 12:
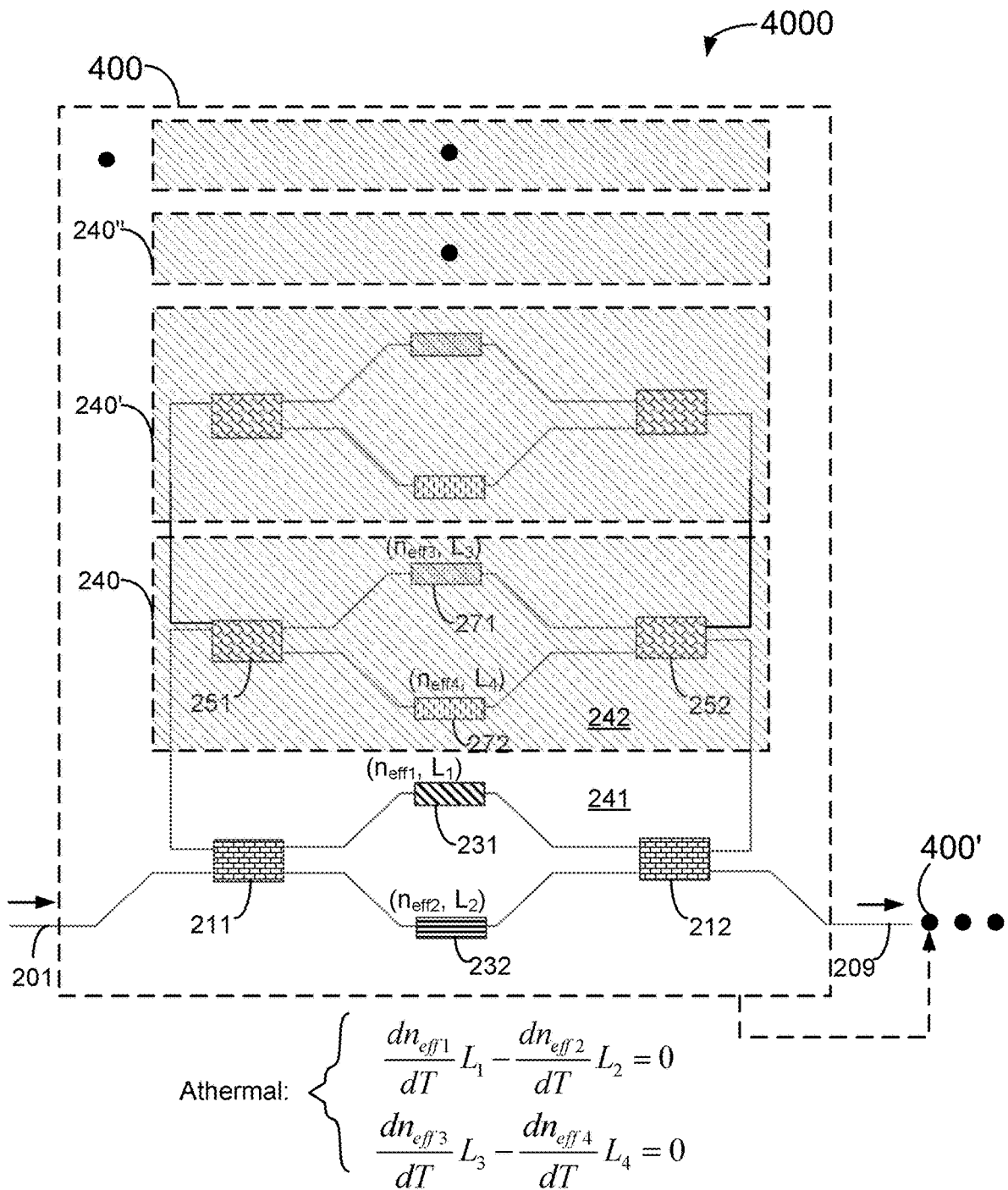
FIG. 12 is a schematic diagram of an optical dispersion compensator in an athermal configuration cascaded in two directions according to another embodiment of the present invention.

FIG. 12 is a schematic diagram of an optical dispersion compensator in an athermal configuration cascaded in two directions according to another embodiment of the present invention. This diagram is merely an example, which should not unduly limit the scope of the claims. One of ordinary skill in the art would recognize many variations, alternatives, and modifications. As shown, the optical dispersion compensator 4000 is formed by cascading in two directions. A first cascading is executed for multiple feedback part 240 coupled in parallel to form a first cascaded compensator 400 by combining with the main branch which remains unchanged. Then a second cascading is executed by using the first cascaded compensator 400 as a cascading unit to couple each other in series, forming the optical dispersion compensator 4000. Optionally, each first cascading unit 240, 240', 240", . . . can be the same or different in phase shift but all are kept in athermal condition defined by formula (1). In other words, each first cascading unit 240, 240', 240", . . . is an athermal MZ interferometer. Each first cascaded compensator 400 overall is also configured to be an athermal one. Optionally, each next first cascaded compensator 400' can be the same or different in phase shift comparing to the first cascaded compensator 400 and the same in an athermal configuration.

In yet another aspect, the present disclosure provides a silicon photonics system comprising a single silicon-on-insulator substrate formed with a dispersion compensator described herein.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An optical dispersion compensator comprising:
   a first phase-shifter;
   a second phase-shifter;
   a first 2×2 splitter having a first exit port coupled to an input port of the first phase-shifter and a second exit port coupled to an input port of the second phase-shifter;
   a second 2×2 splitter having a first entry port coupled to an output port of the first phase-shifter and a second entry port coupled to an output port of the second phase-shifter;
   a third phase-shifter on the silicon substrate having an input port coupled to a first exit port of the second 2×2 splitter and an output port coupled to a first entry port of the first 2×2 splitter to form an optical loop with the first phase-shifter and the second phase-shifter;
   wherein the second entry port of the first 2×2 splitter is configured as an external input and the second exit port of the second 2×2 splitter is configured as an external output, wherein the optical loop is characterized by a total phase delay tunable via each of the first phase-shifter, the second phase-shifter, and the third phase-shifter such that a normal dispersion (>0) at a certain wavelength in the external input is substantially compensated and independent of temperature.

2. The optical dispersion compensator of claim 1, wherein the first phase-shifter is a first waveguide formed on the silicon substrate, the second phase-shifter is a second waveguide formed on the same silicon substrate, the second waveguide coupled with the first waveguide in parallel to form a Mach-Zehnder interferometer, and the third phase-shifter is a third waveguide formed on the same silicon substrate.

3. The optical dispersion compensator of claim 2, wherein the first waveguide comprises a first core material with a first index of refraction and an elongated shape of the first length embedded in a first cladding material on the silicon substrate yielding a first phase delay at the certain wavelength, the second waveguide comprises a second core material with a second index of refraction and an elongated shape of the second length embedded in the first cladding material on the silicon substrate yielding a second phase delay at the certain wavelength, the third waveguide comprises a third core material with a third index of refraction and an elongated shape of the third length embedded in a second cladding material filled in a window of the first cladding material on the silicon substrate yielding a third phase delay at the certain wavelength.

4. The optical dispersion compensator of claim 3, wherein the total phase delay is a manifestation of the first phase delay, the second phase delay, and the third phase delay associated with the Mach-Zehnder interferometer and the optical loop to achieve an abnormal dispersion (<0) that just compensates the normal dispersion at the certain wavelength in the external input.

5. The optical dispersion compensator of claim 2, wherein the silicon substrate is a silicon-on-insulator substrate used for forming a chip of the silicon photonics system.

6. The optical dispersion compensator of claim 3, wherein the first core material and the second core material are at least one material selected from single crystal silicon, poly-crystal silicon, SiN, $Si_3N_4$, SiON, and silicon germanium alloy, and the third core material comprises a material selected from single crystal silicon, poly-crystal silicon, SiN, $Si_3N_4$, SiON, and silicon germanium alloy.

7. The optical dispersion compensator of claim 6, wherein the first cladding material comprises a material having an index of refraction smaller than each of the first index of refraction and the second index of refraction, selected from $SiO_2$, SiN, $Si_3N_4$, SiON, Air, silicon germanium alloy, and indium tin oxide, the second cladding material comprises a material having an index of refraction smaller than the third index of refraction and a negative thermal-optical coefficient, selected from Polymethyl Methacrylate (PMMA) and Potassium Aluminophosphate glass (KAP).

8. The optical dispersion compensator of claim 3, wherein each of the first core material, the second core material, and the third core material comprises a cross-section shape selected from a rectangle, a combination of two rectangles, and a triangle.

9. The optical dispersion compensator of claim 3, wherein the first phase-shifter, the second phase-shifter, and the third phase-shifter comprises respectively a first heating element, a second heating element, and a third heating element for independently tuning the first index of refraction, the second index of refraction, and the third index of refraction by changing temperature thereof.

10. The optical dispersion compensator of claim 9, wherein the first phase-shifter and the second phase-shifter are substantially limited under an athermal condition that a temperature variation of a first effective index of refraction multiplied by the first length cancels a temperature variation of a second effective index of refraction multiplied by the second length, wherein the first effective index of refraction is resulted from both the first core material and the first cladding material and the second effective index of refraction is resulted from both the second core material and the first cladding material; the third phase-shifter is configured to ensure that a temperature variation of a third effective index of refraction resulted from both the third core material and the second cladding material is substantially zero.

11. The optical dispersion compensator of claim 1, wherein the external input is a single-mode fiber.

12. The optical dispersion compensator of claim 1, wherein the certain wavelength can be at least one wavelength corresponding to one channel selected from a broad band for telecommunication.

13. The optical dispersion compensator of claim 1, wherein each of the first 2×2 splitter and the second 2×2 splitter is one selected from a multimode-interference (MMI) coupler and a directional coupler.

14. The optical dispersion compensator of claim 1, wherein the first phase-shifter and the second phase-shifter including at least the first 2×2 splitter can be used as a duplicate phase-shifter unit cascaded in series multiple times in the optical loop that couples with the third phase-shifter for achieving different values in total phase delay, wherein each phase-shifter unit is constrained under the athermal condition that a temperature variation of a first effective index of refraction multiplied by the first length of the first phase-shifter therein cancels a temperature variation of a second effective index of refraction multiplied by the second length of the second phase-shifter therein.

15. The optical dispersion compensator of claim 1, wherein the third phase-shifter is a combined phase-shifter including two waveguides coupled to each other in parallel, the two waveguides being respectively coupled with the first entry port of the first 2×2 splitter via a first 1×2 splitter and the first exit port of the second 2×2 splitter via a second 2×1 splitter to form the optical loop, wherein the two waveguides are either two identical ones or constrained under an athermal condition that a temperature variation of a first effective index of refraction multiplied by a first length of a first one of the two waveguides therein cancels a temperature variation of a second effective index of refraction multiplied by a second length of a second one of the two waveguides therein.

16. The optical dispersion compensator of claim 15, wherein the third phase-shifter can be further used as a duplicate phase-shifter unit cascaded in parallel multiple times in the optical loop associated with the first phase-shifter and the second phase-shifter for achieving different values of total phase delay.

17. A method for forming an optical dispersion compensator, comprising:
providing a silicon-on-insulator substrate;
forming a first waveguide in a first cladding material on the silicon-on-insulator substrate, the first waveguide being optically coupled to a first 2×2 coupler;
forming a second waveguide in the first cladding material on the silicon-on-insulator substrate, the second waveguide being optically coupled to the first waveguide in parallel and coupled to a second 2×2 coupler;
forming a window of the first cladding material;
forming third waveguide in the window, the third waveguide being surrounded by a second cladding material filled in the window, the third waveguide being coupled to a first entry port of the first 2×2 coupler and a first exit port of the second 2×2 coupler to form an optical loop with the first waveguide and the second waveguide;
coupling a second entry port of the first 2×2 coupler to an external input and a second exit port of the second 2×2 coupler to an external output;
wherein the optical loop is characterized by a total phase delay tunable via each of the first waveguide, the second waveguide, and the third waveguide such that a normal dispersion (>0) at a certain wavelength in the external input is substantially compensated and independent of temperature.

18. The method of claim 17, wherein forming the first waveguide and the second waveguide comprises forming at least a heating element configured to tune phase delays of the first waveguide and the second waveguide.

19. The method of claim 17, wherein forming the first waveguide and the second waveguide further comprises selecting proper core materials and lengths respectively for the first waveguide and the second waveguide and cladding material for the first cladding material such that a combination of the first waveguide and the second waveguide is constrained to an athermal condition that a temperature variation of a first effective index of refraction multiplied by a first length of the first waveguide cancels a temperature variation of a second effective index of refraction multiplied by a second length of the waveguide.

20. The method of claim 17, wherein forming the third waveguide comprises selecting proper core material and length for the third waveguide and cladding material for the second cladding material such that the third waveguide is constrained to an athermal condition that a temperature variation of an effective index of refraction is substantially zero.

21. The method of claim 17, wherein forming the third waveguide further comprises forming a combined phase-shifter including two waveguides coupled to each other in parallel, the two waveguides being respectively coupled with the first entry port of the first 2×2 splitter via a first 1×2 splitter and the first exit port of the second 2×2 splitter via a second 2×1 splitter to form the optical loop, wherein the two waveguides are either two identical ones or constrained under an athermal condition that a temperature variation of a first effective index of refraction multiplied by a first length of a first one of the two waveguides therein cancels a temperature variation of a second effective index of refraction multiplied by a second length of a second one of the two waveguides therein.

22. The method of claim 19, further comprising cascading in series multiple units of the first waveguide and the second waveguide in the optical loop with the third waveguide for achieving different values of total phase delay, each unit of the first waveguide and the second waveguide being coupled in parallel to each other and still satisfied the athermal condition.

23. The method of claim 21, further comprising cascading in parallel multiple units of the combined phase-shifter in the optical loop with the first waveguide and the second waveguide for achieving different values of total phase delay, wherein each unit of the combined phase-shifter is constrained under the athermal condition.

* * * * *